United States Patent Office 3,161,175
Patented Dec. 15, 1964

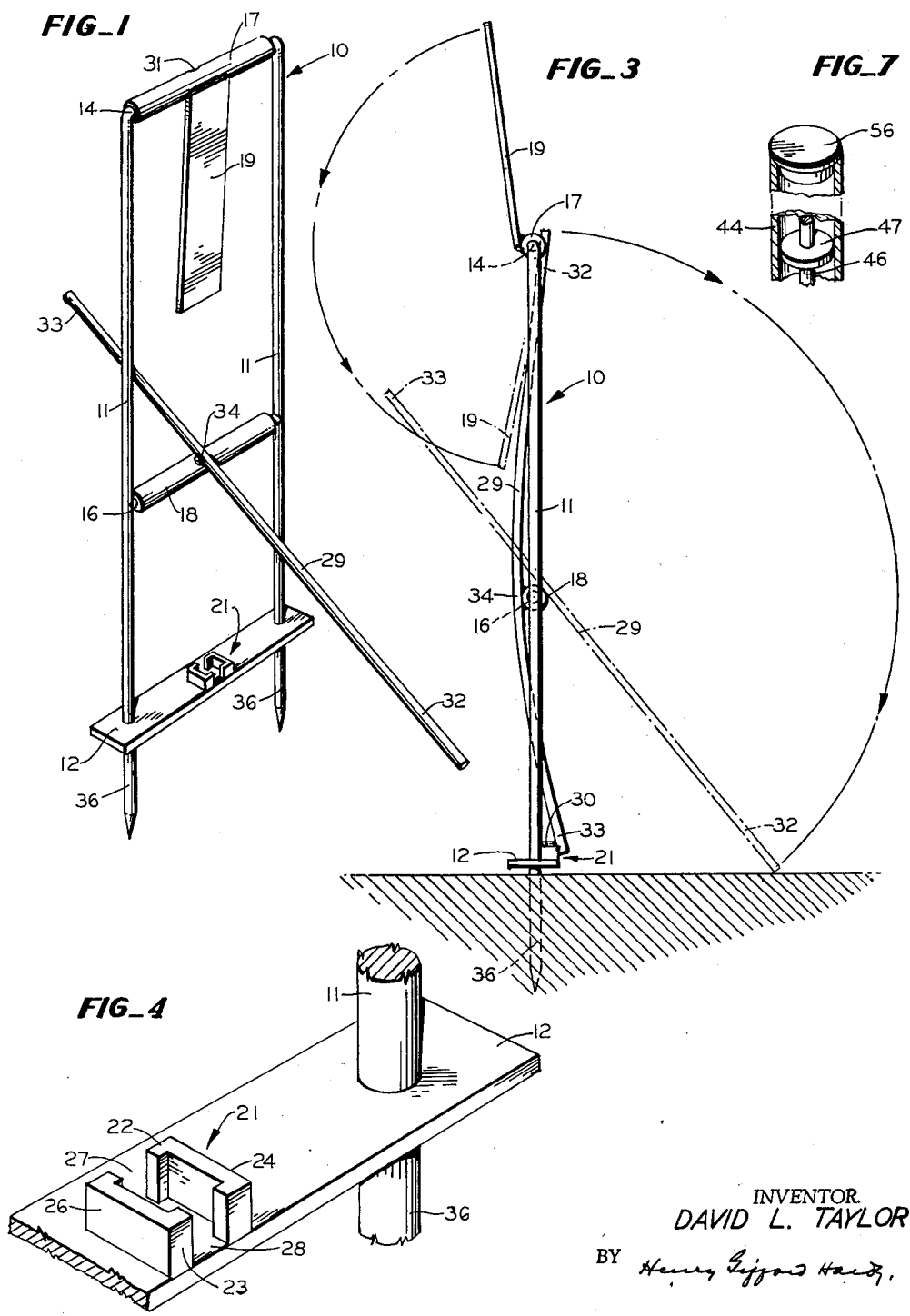

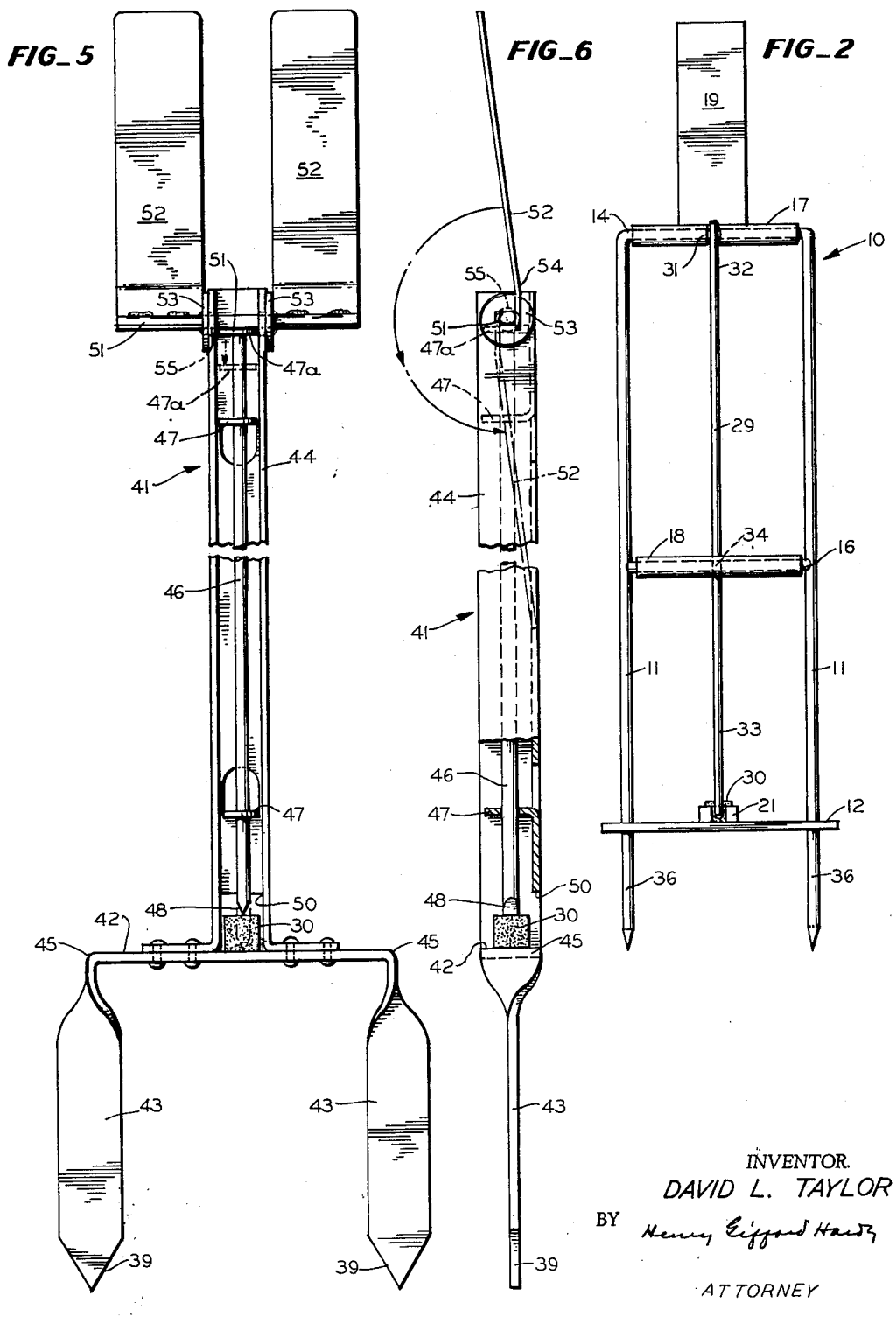

3,161,175
WATER FLOW INDICATOR
David L. Taylor, 1184 Arroyo Drive, Pebble Beach, Calif.
Filed Mar. 20, 1963, Ser. No. 266,756
4 Claims. (Cl. 116—118)

This invention relates in general to an apparatus and method for determining and indicating the presence of a liquid, particularly water. More specifically this invention relates to apparatus and a method for determining and signaling visibly from a distance when flowing water has reached a pre-determined point and level, as in an irrigation ditch.

This invention provides a means of indicating the presence of water, or other liquids, and perhaps the level thereof, at positions remote from an observer. This is made possible by interposing a soluble material in or between two or more cooperating components in such a way that a signal is not possible until the liquid has covered and dissolved the soluble material. Specific apparatus adapted to the method includes a spring or gravity loaded signal which is prevented from operating by the physical presence of sugar, salt, and other solid suitable substances.

In the handling of large quantities of liquids in open spaces such as trenches for irrigation, it is often necessary to know when the liquid has reached a pre-determined point therein. Though not limited thereto this need is particularly apparent in handling irrigation water, brine, and other aqueous solutions upon the open soil or substrates of earth. In the irrigation of long rows of vineyards, orchards, truck garden crops, cotton and the like, the farmer or other attendant must frequently check the high water mark and extent of flow by walking from one end of the row to the other. While his march is in progress, it is not infrequent the water overflows at some other point and, being far from the point of the ditch where he might divert the flow, he must seek to either minimize the break and the loss of water or else hurry to change the row into which the water is flowing. The loss of any water in dry states where irrigation is necessary, is expensive and may even be critical where the amount of water used is restricted.

In the larger ranches, it is not infrequent to have irrigated rows of crops from a quarter of a mile to one mile in length, and it is important to know where the water is at all times. In some instances it requires two men to carry on the operation, one at the other end of the row to signal the arrival of the water.

From the foregoing it can readily be seen that the need exists for a simple signal means of determining remotely when water or other liquid has reached a specific point, as in the rows of a vineyard, for example. The signal should be observable at any level of sight over any accumulation of growth but known beforehand, and for distances preferably as far as from a few hundred yards to a mile or more away. The signal should not become operative many times until the water has reached a pre-determined height or level in a ditch or "check" of a long flat area being flooded. The signal on the other hand should be reliably operative in considerable amounts of dust, dirt, mud and other impediments that may be present. The size and weight of the device as well as cost should be minimized.

The present invention provides the answer to this apparent need in the art. The preferred embodiment of the invention comprises a rigid flag or signal member mounted for pivotal movement on the top of a frame secured to a base of adjustable height. The flag is set in the up position and restrained from movement downwardly by spring or gravity loaded means extending to the base where such means is prevented from movement by trigger means including a sugar cube in engagement with the working mechanism thereof. As water covers the base and the sugar cube, the cube dissolves, thereby discharging the trigger means and releasing the flag so that it is permitted to pivot to the downward position. Additional novelty is seen in the several embodiments and the particular combination of elements comprising each.

A particular advantage of the invention is that the apparatus may be constructed of a lightweight, movable frame which may easily be stored, transported and set up from place to place without damage. Another advantage is that by incorporation of prongs under the base capable of being driven into the ground by stepping on the base, the base may be set up easily at ground level, below ground level or considerably above ground level. Below ground level even a slight amount of moisture will dissolve the cube of sugar; yet debris and mud will not ordinarily interfere with the trigger mechanism. Another advantage is that sugar cubes are of uniform dimensions so that relatively close working tolerances may be relied upon. Another advantage is that the sugar is easily obtainable, inexpensive, and extremely soluble in water.

Accordingly, an object of the invention is to provide a method and apparatus for signaling when a liquid is present.

Another object of the invention is to provide an apparatus which may be used in irrigating crops to indicate when water has reached a pre-determined point during the irrigating.

Another object is to provide such an apparatus which will not be precluded from operating by the presence of mud, dust, debris or other matter.

Yet another object is to provide such an apparatus which may be easily transported from place to place and set for operation.

Still another object of the invention is to provide an apparatus which indicates the presence of water by turning a signal arm downwardly.

An object of the invention is to provide such an apparatus in which the signal arm may be seen and its position determined from distances up to approximately one mile.

A further object of the invention is to provide such an apparatus in which the signal is actuated by the melting of a cube of sugar on the base of the apparatus when contacted by water, whereby a spring driven or gravity actuated mechanism is released which permits the signal arm to drop.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

In the drawings:

FIGURE 1 is a perspective view of the water indicator of the present invention in the uncocked position;

FIGURE 2 is a front elevational view of the water indicator in the cocked position;

FIGURE 3 is a side elevational view of the device

FIGURE 2 in the cocked position with the broken lines showing the swings to the uncocked position;

FIGURE 4 is an enlarged perspective view of the base of the water indicator, partly cut away, showing the retaining means for the sugar cube;

FIGURE 5 is an elevational front view of an alternate embodiment;

FIGURE 6 is an elevational side view of the alternate embodiment of FIGURE 5; and FIGURE 7 is a fragmentary perspective view partly in section of a tubular body member.

Referring now to the drawings, and particularly to FIGURES 1 through 4, there is shown a water indicator 10 comprising two vertical support bars 11 mounted one at each end of flat base member 12. Fastened between them is a support rod 14 at the top thereof and also somewhat below the midpoint thereof is the cross rod 16. Mounted loosely around the rods 14 and 16 are tubular sleeves 17 and 18 which are free to rotate about the rods 14 and 16. Tangentially attached to the central portion of the upper tubular sleeve 17 is a flag member 19. As shown in FIGURE 3, the flag member 19 is attached in any suitable and stable manner at one end thereof. Being mounted off center or tangentially it will be apparent that its weight alone will not permit it to remain in the vertical position but will normally hang downwardly in the uncocked position shown in broken lines in FIGURE 3. The flag 19 is preferably colored red or other bright pigment on one side so that it can be sighted some distance away when in the uncocked position and white on the opposite side in the cocked position, in distinction to the colors green, blue, etc., and other pastels. Fluorescent materials are particularly useful. The size of the flag will to some extent be governed by the distance it is to be sighted. If the distance to be used is upward of one quarter to half a mile or more, the flag should be as large as convenient and constructed of a thinner or lighter weight material so as not to inadvertently unload the trigger mechanism.

Mounted rigidly on the top surface and along one edge of base 12 between supports 11 is retainer 21 which consists of an open box having interrupted side walls 22 and 23 and end walls 24 and 26, the inside dimensions being 0.600 inch square so that a standard size sugar cube 30 can be retained therein. Side walls 22 and 23 are interrupted to provide facing openings 27 and 28. The openings are of such dimensions that trigger member 29 will readily pass through both, especially when it is under tension as will be described.

It will be noted that while sugar is preferred, other soluble solids may be used in place thereof and in that instance the retainer must be shaped and positioned to correspond to the size of the lumps or granules. If integrated enough to be resistant to pressure, i.e., as brought about by pressure of a rod, agglomerated finely divided materials may be used. However, it will be appreciated that because of its availability, common usage, standard size, price, rate of solubility, and other factors, cubed sugar is preferred. One additional reason why sugar is preferred is that in cubed form it is relatively resistant to the force of heavy objects without crushing and therefore may be used to stop or restrain substantial weight and force.

Trigger member 29 is a tension rod member fastened and rotatable with tubular sleeve 18 at 34, tangentially on the same side as the flag 19. It extends from the base 12 to beyond the upper sleeve 17 where end 32 is carefully positioned to enter a vertically slotted opening 31 in tube 17. The opening 31 is on the same side of the tubular sleeve from the flag 19. When flag 19 is held in the upward or cocked position the opening 31 is on the same side of the frame 11 as the retainer 21. Trigger rod 29 in the preferred embodiment is made of metal or other suitable material, which is elastic enough to bend under tension and yet spring to immediately regain its former shape when released from tension. The lower end 33 of trigger member 29 extends only as far as retainer 21. It should be noted that point 34, when the trigger 29 is in cocked position and engaged in the opening 31, and is restrained at the opening 28 in the retainer 21, it is on the distal side of the frame 11.

In order for the trigger member 29 of the invention to cooperate properly therewith, opening 31 should be of a width to securely retain the upper end 32 of trigger member 29. The opening 31 being a cut through the side wall of the tube will permit the end 32 of member 29 to fit snugly into a single position when the flag 19 is up and prevents rotation of the tube 17. The end 32 presses against the rod 14 so that there will be no inadvertent dislodging thereof from opening 31. The end 32 of trigger 29 when in the cocked position is held in opening 31 so long as the opposite end 33 is restrained from movement through slots 27 and 28 by a cube of sugar 30 in retainer 21, as discussed hereinafter.

In the use of the water indicator 10, it is usually desirable to provide means for solidly "planting" or setting the unit in soil or earth so that it will not fall, be knocked down, or blown over. Accordingly, the bottom of the base 12 is provided with cleats 36 so that by a simple stepping on the base 12, the cleats are driven into the soil to hold the indicator 10 in position. It should be noted, of course, that the soil will often be dry and therefore hard, or else sandy and therefore friable so that the cleats must be long enough, wide enough and sharp enough to properly penetrate the soil and retain unit 10. The depth at which the cleats are to be driven may be made to depend upon the height of water at which it is desired to have the signal operate. It is apparent that the signal cannot operate unless and until the water reaches the sugar cube 30 and then operates in accordance with the rate of solubility of the cube.

After the water indicator 10 is solidly positioned in the soil at the end of a row to be irrigated, the flag or signal 19 is raised to the vertical position by hand where it can be seen by the operator at the other end of the row. At the same time end 32 of trigger element 29 is rotated to the vertical position and inserted into opening 31. While maintaining the end 32 in the slot 31, end 33 is pushed through gaps or openings 27 and 28 of retainer 21. It will be noted that force is required to accomplish this latter act since the trigger 29 is now under tension and distorted from true vertical. (See FIGURE 3.) Once the trigger portion 32 is thusly under tension, flag 19 remains held upwardly in place by friction forces in opening 31, amongst others. While shorter trigger end 33 extends through openings or gaps 27 and 28, a sugar cube 30 of standard size is inserted into retainer 21 and end 33 is then permitted to enter gap 28 where it is prevented from further return movement by the sugar cube 30. The sugar cube thus retains trigger rod 29 from releasing flag 19 until water has reached the sugar, dissolved it, and permitted end 33 of trigger member 29 to pass through retainer 21 and out gap 27. At that time, end 32, being longer and heavier than end 33, falls away from opening 31, and flag 19 drops by gravity to expose the opposite surface of the flag indicating the presence and desired depth of water at that point.

The alternate embodiment of the invention is shown in FIGURES 5 and 6. Here the water indicator generally designated 41, has a flat base 42 having its outer ends bent downwardly at right angles as at 45 and twisted 90° to form the spikes 43 which are of the same width as the base 42. These may be pointed as at 39 in order to secure better penetration of and resistance in the soil. Centrally of the base 42 a channel 44 is suitably secured in vertical position. Adjacent the lower end of the channel which is secured to the base 42, a through cut 50 is made so there is free passage through and between the legs of the channel 44. Mounted within the channel 44 for rectilinear vertical movement is a rod 46 which is spaced in axial alignment by spaced tabs 47 which are cut out of the web of the channel and provided with holes to allow easy motion without cocking or binding. The tabs 47 are spaced along the channel 44 to provide easy movement of the rod 46. A washer 47a may be secured at the top end so as to provide a larger end bearing surface than would be provided by the end of the rod 46, the purpose of which will be explained hereinafter.

Adjacent the upper end of the channel 44 transverse holes 55 are aligned and drilled in the legs thereof, through which passes a flat rod 51 with its sides rounded. Washers 53 are secured to the flattened rod 51 on the outside of the channel 44 to permit the rod 51 to rotate freely within the holes 55 without lateral dislodgment. Outward of the washers 53 signal plates or flags 52 are secured to one of the rounded sides of the rod 51. The signal plates 52 are mounted in any suitable manner at each end of the rod 51 and are slightly bent at 54 in order to secure their out of balance position and yet make it simpler to retain the substantially vertical position shown in FIGURES 5 and 6. The lower end of the rod 46 may be sharpened or pointed to a chisel point 48, as shown in the drawings.

In the operation of the water indicator of the alternate embodiment, the cleats or spikes 43 are positioned at the end of an irrigating trench or furrow so that the device is transverse to the expected flow of water. To set or cock the machine, the flags 52 are raised to the substantially vertical position which exposes a bottom flat face of the rod 51 within the channel 44. The rod 46 is then raised a sufficient distance to permit the placement of a cube of sugar 30 within the through opening 51 of the channel 44 and bring the point 48 of the rod 46 to rest on the top surface of the sugar cube. In this manner the spacer washer 47a or the upper end of the rod 46 is brought to bear against the lower flat surface of the rod 51 which pushed the rod 51 upwardly in the transverse holes 55 and provides sufficient contacting surface to maintain the flags 52 in their vertical or cocked position.

As the water reaches the location of the device and rises so that it contacts the sugar cube 30, the sugar cube will be dissolved by the water and its solid form will disintegrate. With this occurrence the shaft or rod 46 moves downwardly within the channel 44. At the same time the holding pressure of the washer 47a (or the end of rod 46) against the bottom side of the flattened rod 51 is released and drops out of contact therewith. There is a slight thrust due to the off balance of the reflector flags 52 which cause them to rotate the shaft 51 in the holes 55 and drop by gravity to the uncocked position shown in dotted lines in FIGURE 6. This then exposes the opposite face of the flags or reflector sheets 52 giving a different color so as to indicate the presence of a sufficient quantity of water at the point where the device is located. This change of position and color of the reflector flags 52 can be seen by the operator at a remote point without having to traverse the row undergoing irrigation and gives him complete knowledge and control without leaving the place where the main valve is located.

It is apparent that a number of these devices can be placed so that there is one at each row end in an entire field. When a field is undergoing irrigation the farmer or rancher may stand at one point in the field adjacent the irrigation control valves and tell immediately whether or not the irrigation is proceeding according to plan. If the water does not reach the device at any particular row the sugar cube 30 will not be dissolved and the flag will not change its set location or position. This will indicate immediately to the operator that there is something wrong and he can adjust the control valves before there is any loss of water due to the diversion and then proceed to locate the errant row.

The channel 44 may be a tube and the tabs 47 may be spaced washers secured to the rod 46 which guide on the inner surface of the tube to secure foolproof rectilinear movement. In such a case the open end of the tube 44 may be plugged with plug 56 to prevent the entry of dirt, mud and other contaminents which might affect the free movement of the rod 46. (See FIGURE 7).

I claim:

1. In an apparatus for indicating the presence of water the combination comprising a substantially vertical body member, means at the lower end of said body for penetrating the ground to maintain a substantially vertical operative position, means for retaining water soluble solid material in a small confine in said body above the penetrating holding means, a water soluble solid material in said confine, an elongated rod having one end in contact with and restrained by said material and positioned to penetrate said confine by its own gravity upon the dissolving of said material, and separate signal means offset and rotatably mounted at the upper end of said body member for free rotation in a vertical plane engageably set in an upward position and restrained against gravity by the other end of said rod when said rod is restrained from penetrating said confine.

2. Apparatus for indicating the presence of water by the disintegration action of a solid water soluble material, in combination an elongated housing having spaced guide means therein, a trigger rod mounted for slidable movement in said housing in said guide means, means associated with said housing for restricting the downward vertical travel of said trigger rod, said means also supporting a solid water soluble material to further restrict the travel of said rod when interposed therebetween, a solid water soluble material interposed between said rod and said restricting means and in direct contact with each, spade-like means mounted at one end of said housing for locating the apparatus substantially vertically in the ground, flag means rotatably mounted at the opposite end of said housing held in an off balanced position by the upper end of said trigger rod when a solid water soluble material is interposed to restrain its travel, and released to a balanced position when said restraining material is disintegrated.

3. The apparatus of claim 2 wherein the solid water soluble material is cubed sugar.

4. The apparatus of claim 2 wherein only the binder of the material is water soluble.

References Cited in the file of this patent

UNITED STATES PATENTS

| | | |
|---|---|---|
| 1,451,056 | Schindler | Apr. 10, 1923 |
| 2,584,425 | Cox | Feb. 5, 1952 |
| 2,591,037 | Adam | Apr. 1, 1952 |
| 2,594,885 | Due | Apr. 29, 1952 |
| 2,693,781 | Opp et al. | Nov. 9, 1954 |
| 2,740,371 | Nelson | Apr. 3, 1956 |
| 2,990,806 | Stock | July 4, 1961 |
| 3,012,536 | McCleare | Dec. 12, 1961 |